United States Patent
Ruben et al.

(10) Patent No.: US 10,091,286 B1
(45) Date of Patent: Oct. 2, 2018

(54) METHOD AND SYSTEM FOR ENHANCED CLIENT-SERVER COMMUNICATION IN A CACHED COMMUNICATION ENVIRONMENT

(75) Inventors: Darlene J. Ruben, Manchester, NH (US); William D. Berry, Brookline, NH (US); Peter A. Spooner, Hollis, NH (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 157 days.

(21) Appl. No.: 13/556,443

(22) Filed: Jul. 24, 2012

Related U.S. Application Data

(63) Continuation-in-part of application No. 13/431,011, filed on Mar. 27, 2012.

(51) Int. Cl.
| | |
|---|---|
| *G06F 15/16* | (2006.01) |
| *H04L 29/08* | (2006.01) |
| *G06F 17/30* | (2006.01) |
| *G06F 11/20* | (2006.01) |
| *G06F 17/22* | (2006.01) |

(52) U.S. Cl.
CPC ...... *H04L 67/1095* (2013.01); *G06F 11/2082* (2013.01); *G06F 17/2288* (2013.01); *G06F 17/30174* (2013.01); *G06F 17/30575* (2013.01)

(58) Field of Classification Search
CPC ........... H04L 67/1095; G06F 17/30575; G06F 17/30174; G06F 11/2082; G06F 17/2288
See application file for complete search history.

(56) References Cited

U.S. PATENT DOCUMENTS

| | | | |
|---|---|---|---|
| 7,526,561 B2* | 4/2009 | Bloch et al. ................... | 709/229 |
| 8,516,050 B1* | 8/2013 | Chapweske ........ | H04N 1/00204 709/204 |
| 2003/0097381 A1* | 5/2003 | Detweiler ......... | G06F 17/30008 |
| 2004/0127242 A1* | 7/2004 | Dashevsky et al. .......... | 455/502 |
| 2005/0120355 A1* | 6/2005 | Kraft ................. | G06F 17/30578 719/313 |
| 2008/0104206 A1* | 5/2008 | Novik et al. ................... | 709/220 |
| 2009/0216815 A1 | 8/2009 | Braginsky et al. | |
| 2014/0143283 A1 | 5/2014 | Sim-Tang | |

* cited by examiner

*Primary Examiner* — Abdulkader M Alriyashi
(74) *Attorney, Agent, or Firm* — Dergosits & Noah LLP; Todd A. Noah

(57) ABSTRACT

Enhanced client-server communication in a cached communication environment is described. A server computer executes a server application. The server application requests a server communication application to generate a server object. The server object is independent from a client object that is modified to communicate client data. The server object is associated with a server object identifier. The server application receives a copy of the client object from the server communication application. The copy of the client object is associated with a client object identifier. The server application determines whether the server object identifier has an expected relationship with the client object identifier. The server application applies a disposition rule to data referenced in the copy of the client object if the server object identifier has the expected relationship with the client object identifier.

18 Claims, 4 Drawing Sheets

METHOD AND SYSTEM FOR ENHANCED CLIENT-SERVER COMMUNICATION IN A CACHED COMMUNICATION ENVIRONMENT

CROSS-REFERENCE TO RELATED APPLICATIONS

This application is a continuation-in-part of U.S. patent application Ser. No. 13/431,011, filed Mar. 27, 2012, the entire contents of which are incorporated herein by reference.

BACKGROUND

A client-server model is a computing model which partitions tasks or workloads between the providers of a resource or service, called servers, and resource or service requesters, called clients. Clients and servers communicate over a computer network. A server is a host computer that runs server programs which share their resources or services with clients. Typically, a client does not share any of its resources or services, but requests a server's resource or service functions. Clients initiate communication sessions with servers which await incoming requests. Functions such as email exchange, web access, and database access are typically built on the client-server model.

Some clients offer their users the option to operate in an "online communication" mode or a "cached communication" mode. In the online communication mode, the client provides the user with access to the user's communications only when the client is communicating online with a server that stores the user's communications. In the cached communication mode, the client may locally store, or cache, at least some of the user's communications, thereby providing the user with access to at least some of the user's communications even when the client is not engaged in online communications with the server that stores the user's communications. Many client-server models that offer a cached communications mode communicate between the client and the server by writing data to and reading the data from an object provided by a communication application. In computer science, an object is any entity that can be modified by the commands of a programming language. Examples of an object include a value, a variable, a function, and a data structure. However, both the client and the server may modify their own copy of the object when the client and server are offline. Consequently, the reestablishment of online communication between the client and the server may result in the loss of data in the objects due to differences between the client's modification to the client copy of the object and the server's modification to the server copy of the object.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
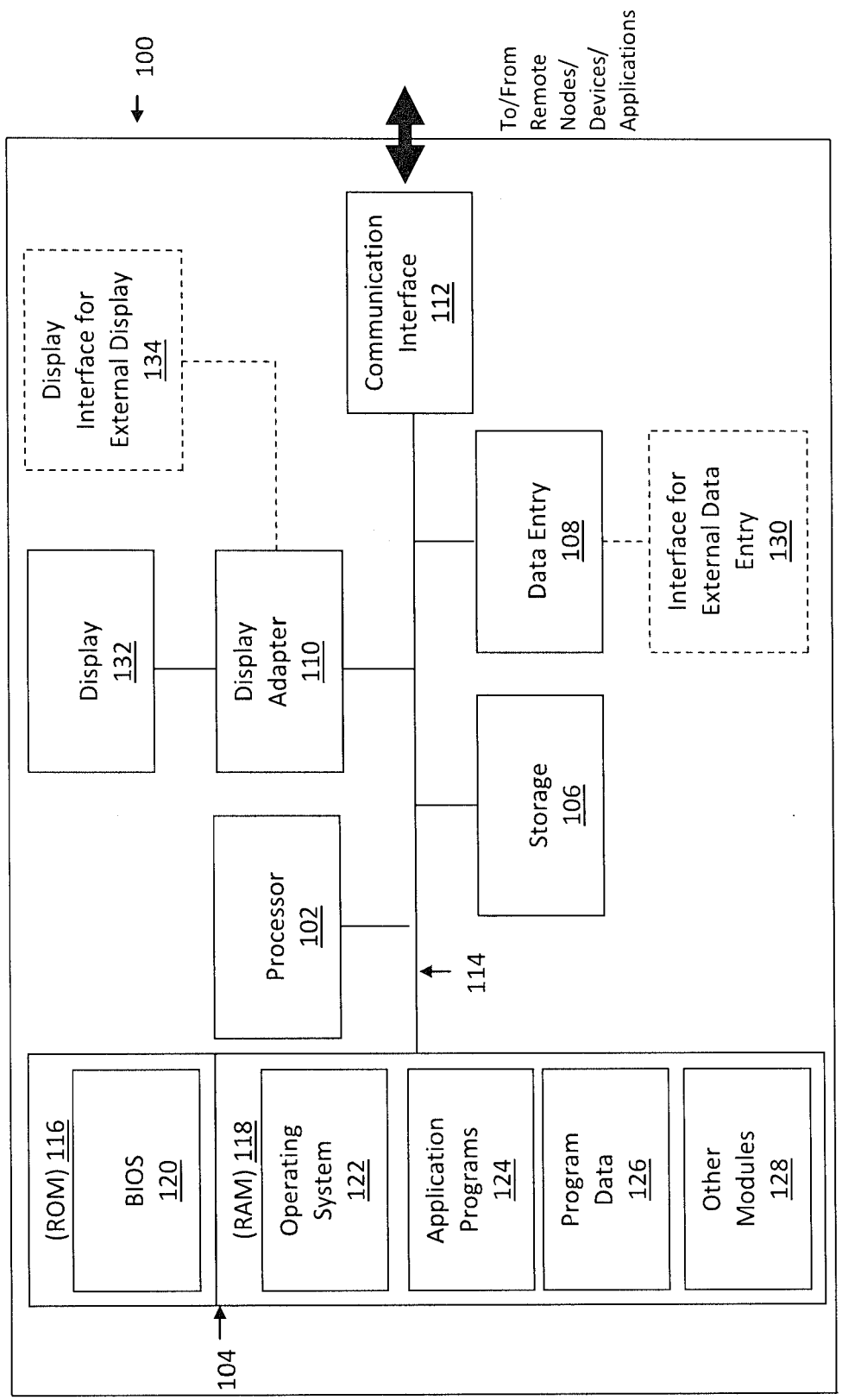
FIG. 1 is a block diagram illustrating an example hardware device in which the subject matter may be implemented.

The subject matter presented herein provides client-server communication in a cached communication environment that provides solutions to prior art problems. Many prior art client-server models use communication applications executing on the client and the server to synchronize the communication object by updating an unmodified copy of the object based on a modified copy of the object. For example, if the client modifies the client's copy of the object to request the deletion of an email XYZ stored in the server's email archive, the communication applications update the server's copy of the object to reflect the request to delete the email, and the server deletes the email based on the request. Many prior art client-server models enable both the client and the server to modify their own copies of the object used to communicate data when the client and server are offline. For example, while the client-server communication is temporarily lost, the server modifies its copy of the object to indicate that the email XYZ has been deleted. Meanwhile the client modifies its own copy of the object to initiate a request for the server to delete the email ABC, which is also stored in the server's email archive. When online communication is reestablished between the client and the server, communication applications executing on the client and the server attempt to synchronize the one object based on their differing copies of the object with the client and the server. Since these prior art client-server models use a single object for communication purposes, such models will ignore one of the copies of the object, typically retaining the copy of the object with the most recent timestamp. If the confirmation of the deletion of the email XYZ has the most recent timestamp, the server may ignore the request to delete the email ABC, even though the client may indicate to a user that the client sent this deletion request. If the request to delete the email ABC has the most recent timestamp, the client may ignore the confirmation of the deletion of the email XYZ, even though the server's records may indicate that the server sent the confirmation of the deletion of the email XYZ to the client. In either situation, the prior art client-server models lose data, and communication records in the client or the server become inaccurate and no longer match.

To reduce the loss of data that may occur in a cached client-server communication environment after client-server communication is offline, one solution is to enable only the client to modify a client object and only the server to modify an independent server object. For example, in an embodiment, while client-server communication is offline, the server modifies the server object to confirm to the client that the email XYZ was deleted from the server's email archive, and the client modifies the client object to add a request for the deletion of the email ABC from the server's email archive to the still pending request for the deletion of the email XYZ. When client-server communication is reestablished, communication applications executing on the client and the server synchronize the independent objects by modifying the server's copy of the client object to request the deletion of the emails ABC and XYZ in the server's email archive, and by modifying the client's copy of the independent server object to confirm to the client that the email XYZ was deleted from the server's email archive. Independent objects for both the client and the server ensure that the data referenced in both objects is retained when client-server communication is re-established, thereby reducing the risk of losing the data referenced in the offline modifications to objects.

While this approach provides a solution to one of the prior art problems, this solution may not be optimal for all circumstances, situations, and conditions. For example, when client-server communication is reestablished, communication applications executing on the client and the server modify the server's copy of the client object to request the deletion of the emails ABC and XYZ in the server's email archive, which may result in the server attempting to delete the email XYZ a second time. While in this example the second attempt to delete the email XYZ may not appear to cause a problem, a second attempt to execute a previously executed transaction may have undesirable results in other situations. For example, a second attempt to withdraw an amount of cash from a checking account may be problematic after the first attempt to withdraw the amount of cash from the checking account was already processed correctly. Although the server may address this issue by reading the server's copy of the client object and determining whether or not the server has already executed the requests contained in the server's copy of the client object, in some situations the process of reading the full contents of an object to determine whether the all of the object's data has already been processed may be an expensive operation. For example, if a client modifies the client's copy of the client object to request the deletion of thousands of emails from the server's email archive, and the server has to read all of the data in the server's copy of the client object and determine whether or not the server has already complied with each of the thousands of email deletion requests, such an operation may have a detrimental impact on the performance of the server.

Embodiments herein enable enhanced client-server communication in a cached communication environment by associating object identifiers, or version numbers, with the server object and the client object and by following a set of rules for interpreting and modifying the object identifiers to ensure that the client and the server are not duplicating the execution of previously executed operations. For example, the rules may instruct a client to apply a disposition rule to data referenced in the client copy of the server object if the client object identifier is equal to the server object identifier, and instruct the server to apply a disposition rule to data referenced in the server's copy of the client object if the server object identifier is not equal to the client object identifier.

For this example, the client object and the server object both begin with the same version number for the object identifiers, the version number 10. When the client modifies the client's copy of the client object to request the deletion of the email XYZ stored in the server's email archive, the client also increments the version number associated with the client object from the number 10 to the number 11, while the version number associated with the server object remains at the number 10. The client object, along with its version number, is then synchronized with the server's copy of the client object. Next, communication is temporarily lost between the client and server. While that communication is temporarily lost, the server compares the version numbers for the server's copies of the client object (the number 11) and the server object (the number 10). Because the version numbers are not equal, the server determines that the client has modified the client copy of the client object, which results in the server processing the data in the server's copy of the client object by deleting the email XYZ from the server's email archive. Then the server replaces any existing data in the server's copy of the server object with the acknowledgement of having deleted the email XYZ from the server's email archive, and also increments the version number associated with the server object from the number 10 to the number 11, which is equal to the version number associated with the client object. Meanwhile the client modifies its copy of the client object by adding a request to delete the email ABC from the server's email archive. Since the version numbers were not equal when the communication was disconnected (the client version number was 11 and the server version number was 10), the client does not increment the version number associated with the client object. The rules instruct the client or the server to postpone the standard processing of version numbers when a comparison of the current version numbers indicates a condition that may lead to the duplication of previously executed operations until the system has the opportunity to update the client and the server on recently executed operations.

When the communication is restored, the client's copy of the client object (containing requests to delete the emails XYZ and ABC and associated with the version number 11) is synchronized to the server and the server's copy of the server object (containing the acknowledgement of the deletion of the email XYZ and associated with the version number 11) is synchronized to the client. The server's copy of the client object now contains both requests to delete email ABC and XYZ from the server's archive. However, since the server's copy of the server object and the server's copy of the client object have version numbers that are equal at 11 the server will take no action on the data in the client object, thereby avoiding the possibility of attempting to delete the previously deleted email XYZ, because the server processes data from the client object only when the version numbers are not equal. When the client checks the version numbers, the client determines that the client's copy of the client object and the client's copy of the server object have version numbers that are equal at 11, and therefore reads the contents of the client's copy of the server object, because the client processes data from the server object only when the version numbers are equal.

Upon reading the acknowledgment of the deletion of email XYZ in the server object, the client removes the deletion request for the email XYZ from the client's copy of the client object, and increments the version number associated with the client object to 12, while the server's version number remains at 11. The client's copy of the client object now contains only the deletion request for email ABC. The client object, along with its version number of 12, is then synchronized with the server's copy of the client container object. When the server determines that the version number of 12 associated with the server's copy of the client object is greater than the version number of 11 associated with the server's copy of the server object, the server proceeds with the deletion of the email ABC from the server's email archive. The version numbers may be metadata or attributes associated with the server object and the client object to eliminate the need to read the full contents of an object to determine whether the all of the object's data has already been processed. Associating object identifiers, or version numbers, with the server object and the client object and following a set of rules for interpreting and modifying the object identifiers enables the client and the server to avoid duplicating the execution of previously executed operations.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for client-server communication in a cached communication environment.

The subject matter presented herein provides enhanced client-server communication in a cached communication environment that provides solutions to prior art problems. Many prior art client-server models enable both the client and the server to modify their own copies of the object used to communicate when the client and server are offline. When online communication is reestablished between the client and the server, communication applications executing on the client and the server attempt to synchronize the object based on the differing copies of the object with the client and the server. Since these prior art client-server models use a single object for communication purposes, such models will ignore one of the copies of the object. Therefore, the prior art client-server models lose some data stored in objects during offline modifications, and communication records in the client and/or the server become inaccurate and no longer match.

Embodiments herein enable enhanced client-server communication in a cached communication environment by providing a client object and a client object identifier that only the client can modify and an independent server object and a server object identifier that only the server can modify, thereby reducing the loss of data that may occur after client-server communication is offline. When client-server communication is offline, the client modifies the client object to communicate client data and the server modifies the server object to communicate server data. When client-server communication is reestablished, communication applications executing on the client and the server synchronize the independent objects by updating the server's copy of the client object and the client's copy of the server object. The server and the client apply a set of rules for interpreting and modifying the object identifiers to determine when to execute a disposition rule and when to avoid the duplication of a previously executed disposition rule. Independent objects for both the client and the server combined with object identifiers ensure that the data referenced in both objects is retained when client-server communication is reestablished, thereby reducing the risk of losing the data referenced in the offline modifications to the objects and the risk of duplicating previously executed operations.

Figure 2:
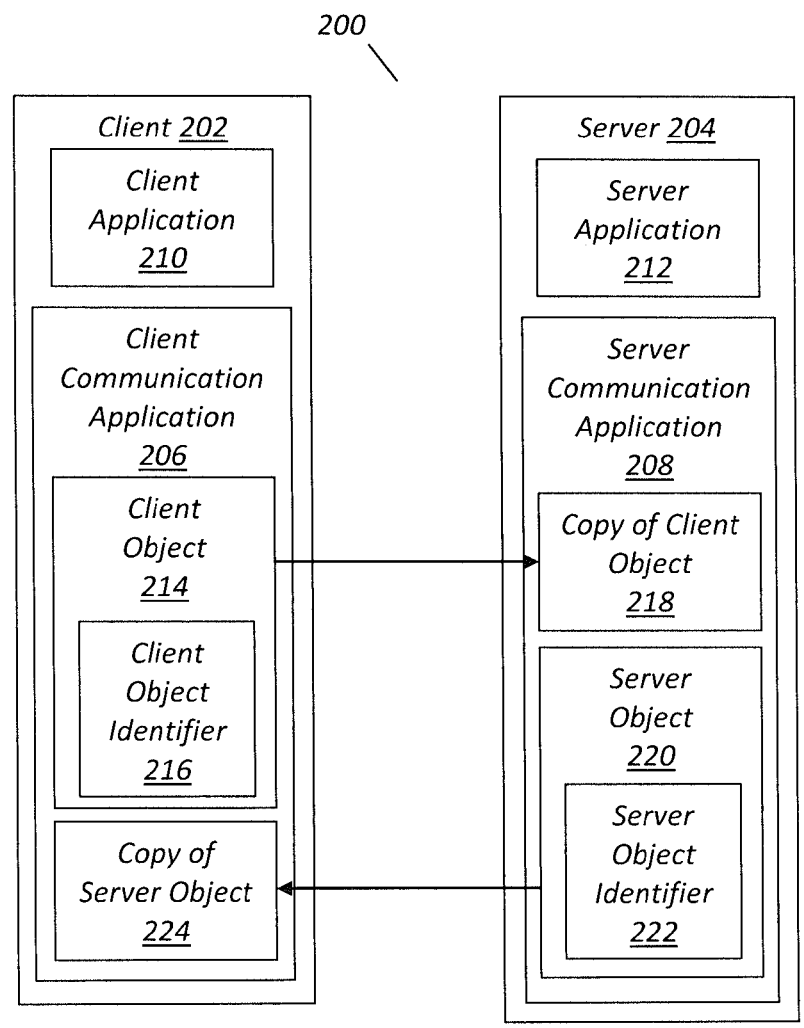
FIG. 2 illustrates a block diagram of an example system for enhanced client-server communication in a cached communication environment, under an embodiment.

FIG. 2 illustrates a block diagram of a system that implements enhanced client-server communication in a cached communication environment, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202 and a server 204 that is provided by a hosting company. Although FIG. 2 depicts the system 200 with one client 202 and one server 204, the system 200 may include any number of clients 202 and servers 204. The client 202 and the server 204 may each be substantially similar to the system 100 depicted in FIG. 1. The client 202 includes a client communication application 206, and the server 204 includes a server communication application 208. The system 200 interacts with the communication applications 206-208, but does not need to modify the communication applications 206-208, which continue to function as the providers of the communication applications 206-208 intended. For example, the system 200 uses the same processes for the communication applications 206-208 to create an object for communication and to synchronize an object. The client 202 also includes a client application 210, and the server 204 also includes a server application 212. The applications 210-212 implement embodiments of the present disclosure.

The client communication application 206 may be a client email application, such as Microsoft Outlook. In order to enable client-server communication, the client application 210 requests the client communication application 206 to generate a client object 214 and an associated client object identifier 216 that are stored in the client 202. Although FIG. 2 depicts the client object 214 as including the client object identifier 216, the client object identifier 216 may be an attribute of the client object 214 or metadata associated with the client object 214. The communication applications 206-208 synchronize the client 202 and the server 204 by the server communication application 208 generating a copy of the client object 218 in the server 204, with the copy of the client object 218 also referencing the client object identifier 216.

The server communication application 208 may be a server email application, such as Microsoft Exchange. In order to reduce the risk of losing the data referenced in the offline modifications to the objects, the server application 212 requests the server communication application 208 to generate an server object 220, which is independent from the client object 214, and an associated server object identifier 222 that are stored in the server 204. Although FIG. 2 depicts the server object 220 as including the server object identifier 222, the server object identifier 222 may be an attribute of the server object 220 or metadata associated with the server object 220. The communication applications 206-208 synchronize the client 202 and the server 204 by the client communication application 206 generating a copy of the server object 224 in the client 202. When client-server communication is reestablished and the communication applications 206-208 synchronize the client 202 and the server 204, offline modifications to the client object 214 by the client application 210 have no direct effect on the server object 220, and offline modifications to the server object 220 by the server application 212 have no direct effect on the client object 214.

The following examples illustrate rules that instruct the client application 210 to apply a disposition rule to data referenced in the client copy of the server object 224 if the client object identifier 216 is equal to the server object identifier 222, and to instruct the server application 212 to apply a disposition rule to data referenced in the server's copy of the client object 218 if the server object identifier 222 is not equal to the client object identifier 216. Alternatively, the rules may instruct the client application 210 to apply a disposition rule to data referenced in the client copy of the server object 224 if the client object identifier 216 is not equal to the server object identifier 222, and to instruct the server application 212 to apply a disposition rule to data referenced in the server's copy of the client object 218 if the server object identifier 222 is equal to the client object identifier 216. Whichever set of rules is selected and applied is not significant provided that the system 200 applies the same set of rules on a consistent basis. The selected rules provide an orderly procedure for the client 202 and the server 204 to execute operations without the risk of duplicating previously executed operations, whether the client 202 and the server 204 have been communicating regularly or whether the client 202 and the server 204 have recently reestablished communications.

The client application 210 modifies the client object 214 to communicate client data, wherein the client object 214 is associated with the client object identifier 216. For example, the client application 210 modifies the client object 214 to communicate a request for the deletion of the email XYZ that is stored in the email archive on the server 204, and the client application 210 increments the client object identifier 216 from a version number of 10 to a version number of 11, which is stored as metadata associated with the client object 214.

The client communication application 206 communicates the data referenced in the client object 214 with the server communication application 208 by synchronizing with the server communication application 208. For example, the client communication application 206 communicates the data that requests to delete the email XYZ from the email archive maintained by the server 204. The server communication application 208 receives and stores a copy of the client object 218, the request to delete the email XYZ, which is associated with the client object identifier 216. The server application 212 receives the copy of the client object 218, such as the request to delete the email XYZ from the server communication application 208, which is associated with the client object identifier 216.

Both the server communication application 208 and the client communication application 206 have access to their own copies of the client objects 214 and 218 and the server objects 220 and 224 even when the client 202 is not engaged in online communications with the server 204. While the client application 210 has write permission for the client object 214, policies for embodiments specify that the server application 212 lacks write permission for the copy of the client object 218. Since the server application 212 can only read the copy of the client object 218, the server application 212 cannot inadvertently or accidentally modify the copy of the client object 218, thereby preserving the copy of the client object 218 for retention of the data referenced in the copy of the client object 218. Therefore, the server application 212 never modifies the copy of the client object 218, thereby preventing the modification of the client object 214 based on differing copies of the client objects 214 and 218 when the communication applications 206 and 208 synchronize the client 202 and the server 204.

In this example, the client object identifier 216 and the server object identifier 222 both began with the same version number, the version number 10. When the client application 210 modified the client's copy of the client object 214 to request the deletion of the email XYZ stored in the email archive of the server 204, the client application 210 also incremented the client object identifier 216 associated with the client object 214 from version number 10 to the version number 11, while the server object identifier 222 associated with the server object 220 remained at the version number 10. Although this example illustrates the client application 210 incrementing the client object identifier 216, the client application 210 may alternatively modify the client object identifier 216 by decrementing the client object identifier 216.

The client object 214, along with its associated client object identifier 216, is synchronized with the server's copy of the client object 218. Next, communication is temporarily lost between the client and server. While that communication is temporarily lost, the server application 212 compares the client object identifier 216 (the version number 11) for the server's copies of the client object 218 and the server object identifier 222 (the version number 10) for the server object 220. Because the object identifiers, or version numbers, are not equal, the server application 212 determines that the client application 210 has modified the client's copy of the client object 214, and that the server application needs to apply a disposition rule.

The server application 212 applies a disposition rule to the data referenced in the copy of the client object 218. For example, the server application 212 responds to this determination by processing the data in the server's copy of the client object 218 by deleting the email XYZ from the email archive of the server 204. In alternative embodiments, the server application 212 may respond by applying a disposition rule when the object identifiers, or version numbers, are equal.

Then the server application 212 replaces any existing data in the server's copy of the server object 220 with the acknowledgement of having deleted email XYZ from the email archive of the server 204, and also increments the sever object identifier 222 associated with the server object 220 from the version number 10 to the version number 11, which is equal to the version number of 11 for the client object identifier 216 associated with the copy of the client object 218. Although this example illustrates the server application 212 incrementing the server object identifier 222, the server application 212 may alternatively modify the server object identifier 222 by decrementing the server object identifier 222.

While communication between the client 202 and the server 204 is not yet reestablished, the client application 210 modifies its copy of the client object 214 by adding a request to delete the email ABC from the email archive of the server 204 to the previous request to delete the email XYZ from the email archive of the server 204. Since the version numbers were not equal when the communication was disconnected between the client 202 and the server 204 (the version number of the client object identifier 216 was 11 and the version number of the server object identifier 222 was 10), the client application 210 does not increment the version number of the client object identifier 216 associated with the client object 214. The rules instruct the client 202 or the server 204 to postpone the standard processing of version numbers when a comparison of the current version numbers indicates a condition that may lead to the duplication of previously executed operations until the system 200 has the opportunity to update the client 202 and the server 204 on recently executed operations. Although this example illustrates the client application 210 not incrementing the version number of the client object identifier 216 when the version numbers were not equal, in alternative embodiments the client application 210 may increment the version number of the client object identifier 216 when the version numbers are not equal.

Similar to the reduction of lost data that could occur when the client 202 communicates client data to the server 204 after client-server communication is reestablished, embodiments also reduce the loss of data that could occur when the server 204 communicates server data to the client 202 after client-server communication is reestablished, and reduce the possibility of duplicating previously executed operations. When the communication is restored, the client's copy of the client object 214 (containing requests to delete the emails XYZ and ABC and associated with the client object identifier 216 that has the version number of 11) is synchronized to the server 204 and the server object 220 (containing the acknowledgement of the deletion of the email XYZ and the associated server object identifier 222 that has the version number of 11) is synchronized to the client 202. The server's copy of the client object 218 now contains both requests to delete email ABC and XYZ from the email archive of the server 204 while the client's copy of the server object 224 has the confirmation of the deletion of the email XYZ from the email archive of the server 204.

Since the server's copy of the server object 220 and the server's copy of the client object 218 have version numbers that are equal at 11, the server application 212 will take no action on the data in the copy of the client object 218, thereby avoiding the possibility of attempting to delete the previously deleted email XYZ. In alternative embodiments, the server application 212 will take no action on the data in the copy of the client object 218 when the server's copy of the server object 220 and the server's copy of the client object 218 have version numbers that are not equal.

When the client application 210 checks the version numbers, the client application 210 determines that the client's copy of the client object 214 and the client's copy of the server object 224 are both associated with version numbers that are equal to 11, and reads the contents of the client's copy of the server object 224. In alternative embodiments, the client application 210 will take no action on the data in the client's copy of the server object 224 when the client's copy of the client object 214 and the client's copy of the server object 224 are associated with version numbers that are equal. Upon reading the acknowledgment of the deletion of email XYZ in the client's copy of the server object 224, the client application 210 applies a disposition rule to the data referenced in the copy of the server object 224 by removing the deletion request for the email XYZ from the client's copy of the client object 214, and increments the client object identifier 216 associated with the client object 214 from the version number of 11 to the version number of 12, while the server object identifier 222 remains at the version number of 11.

The client's copy of the client object 214 now contains only the deletion request for the email ABC. The client object 214, along with its associated client object identifier 216 that has the version number of 12, is then synchronized with the server's copy of the client object 218. When the server application 212 determines that the client object identifier 216 which has the version number of 12, and is associated with the server's copy of the client object 218, is greater than the server object identifier 222, which is associated with the server's copy of the server object 220 and has the version number of 11, the server application 212 proceeds with the deletion of the email ABC from the email archives of the server 204. The server application 212 also increments the server object identifier 222 from the version number of 11 to the version number of 12.

Both the server communication application 208 and the client communication application 206 have access to their own copies of the client objects 214 and 218 and the server objects 220 and 224 even when the client 202 is not engaged in online communications with the server 204. While the server application 212 has write permission for the server object 220, policies for embodiments specify that the client application 210 lacks write permission for the copy of the server object 224. Since the client application 210 can only read the copy of the server object 224, the client application 210 cannot inadvertently or accidentally modify the copy of the server object 224, thereby preserving the copy of the server object 224 for retention of data referenced in the copy of the server object 224. Therefore, the client application 210 never modifies the copy of the server object 224, thereby preventing the modification of the server object 220 based on differing copies of the server objects 220 and 224 when the communication applications 206 and 208 synchronize the client 202 and the server 204.

In alternative embodiments, the object identifiers 216 and 222 function as transaction identifiers for each entry in the objects 214, 218, 220, and 224 rather than version numbers associated with the objects 214, 218, 220, and 224. For example, the client application 210 assigns a transaction identifier of 11 to the request to delete the email XYZ and assigns a transaction identifier of 12 to the request to delete the email ABC. When the server application 212 reads each entry in the server's copy of the client object 218, the server application 212 determines whether the server application 212 has already processed that entry by searching for that transaction identifier in its local repository, such as a server database or a server registry. If the server application 212 finds the transaction identifier for a current entry in its local repository, the server application 212 takes no action on the current entry. However, if the server application 212 does not find the transaction identifier for a current entry in its local repository, the server application 212 takes action on the current entry and adds the transaction identifier for the current entry to the server's local repository. Similarly, when the client application 210 reads each entry in the client's copy of the server object 224, the client application 210 determines whether the client application 210 has already processed that entry by searching for that transaction identifier in its local repository, such as a client database or a client registry. If the client application 210 finds the transaction identifier for a current entry in its local repository, the client application 210 takes no action on the current entry. However, if the client application 210 does not find the transaction identifier for a current entry in its local repository, the client application 210 takes action on the current entry and adds the transaction identifier for the current entry to the client's local repository.

Although the applications 210 and 212 may read their copies of each other's objects 218 and 224 to determine whether or not the requests contained in the copies of each other's objects 218 and 224 have already been executed, in some situations the process of reading the full contents of an object to determine whether the all of the object's data has already been processed may be an expensive operation. For example, if the client application 210 modifies the client's copy of the client object 214 to request the deletion of thousands of emails from the email archive of the server 204, and the server application 212 has to read all of the data in the server's copy of the client object 218 and determine whether or not the server application 212 has already complied with each of the thousands of email deletion requests, such an operation may have a detrimental impact on the performance of the server 204.

Embodiments herein enable enhanced client-server communication in a cached communication environment by associating identifiers, or version numbers, with the server object and the client object. Independent objects for both the client and the server ensure that all objects are retained when client-server communication is reestablished, reducing the risk of losing the data referenced in the offline modifications to objects, while version numbers for the client object and the server object reduce the risk of duplicating the execution of previously executed operations.

Figure 3:
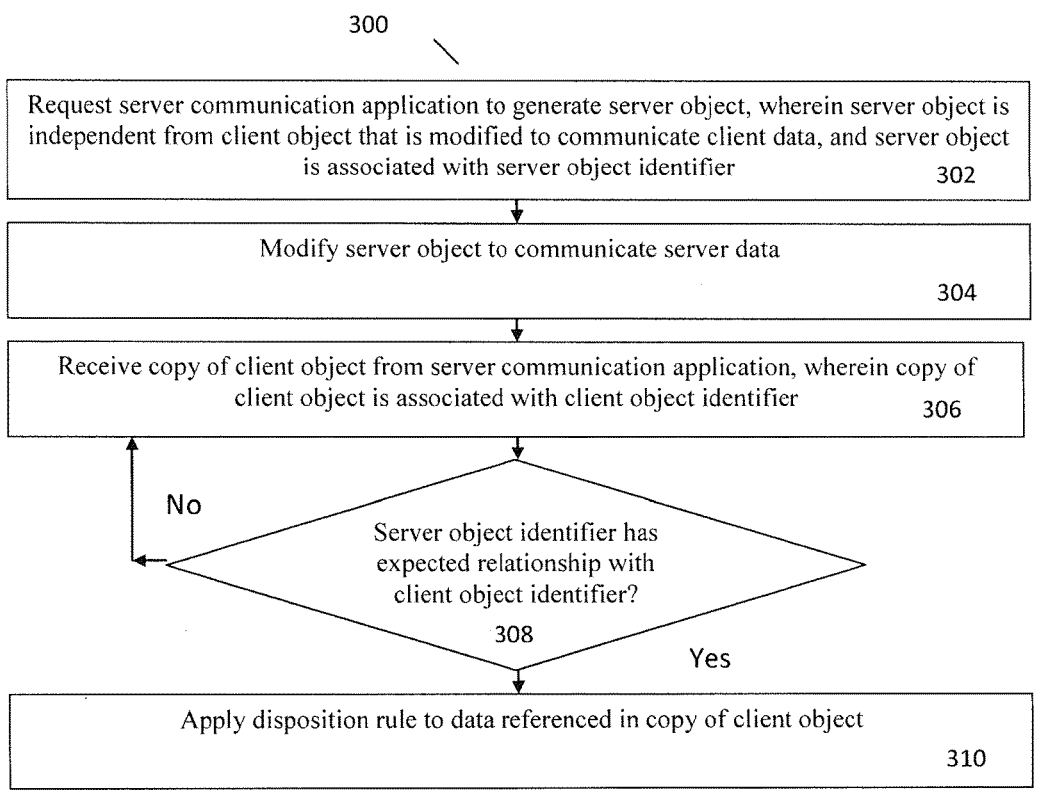
FIG. 3 is a flowchart that illustrates a method of enhanced client-server communication in a cached communication environment, under an embodiment.

FIG. 3 is a flowchart that illustrates a method of enhanced client-server communication in a cached communication environment. Flowchart 300 illustrates method acts illustrated as flowchart blocks for certain steps involved in and between the client 202 and the server 204 of FIG. 2.

The server communication application 208 is requested to generate the server object 220, wherein the server object 220 is independent from the client object 214 that is modified to communicate client data, and the server object 220 is associated with the server object identifier 222, act 302. For example, the server application 212 requests the server communication application 208 to generate the server object 220 and the server object identifier 222, which has the version number of 10. When the communication applications 206-208 synchronize the client 202 and the server 204, the client communication application 206 generates the copy of the server object 224 in response to the server communication application 208 generating the server object 220.

The server object 220 is modified to communicate server data, act 304. For example, the server application 212 modifies the server object 220 to communicate server data that provides a confirmation of the deletion of the email XYZ to the client 202, and also modifies the server object identifier 222 from the version number 10 to the version number 11.

A copy of the client object 218 is received from the server communication application 208, wherein the copy of the client object 218 is associated with the client object identifier 216, act 306. For example, the server application 212 receives the copy of the client object 218 which includes data that requests the deletion of the emails ABC and XYZ from the archives stored in the server 204, along with the associated client object identifier 216, which has the version number of 11.

A determination is made whether the server object identifier 222 has an expected relationship with the client object identifier 216, act 308. For example, the server application 212 determines that the server object identifier 222 has a version number of 11, which is not less than the version number of 11 for the client object identifier 216. If the server object identifier 222 has the expected relationship with the client object identifier 216, the method 300 continues to act 310. If the server object identifier 222 does not have the expected relationship with the client object identifier 216, the method 300 returns to act 306 until the server object identifier 222 has the expected relationship with the client object identifier 216.

A disposition rule is applied to data referenced in the copy of the client object 216, act 310. For example, the server application 212 responds to the client data that requests the deletion of the email ABC by requesting the server communication application 208 to delete the email ABC from the archives stored in the server 204. Following act 310, the flowchart 300 may terminate.

Although FIG. 3 depicts the acts 302-310 occurring in a specific order, the acts 302-310 may occur in another order. The server object 220 that is independent from the client object 214 and is associated with the server object identifier 222 ensures that an offline modification to the client object 214 is retained when client-server communication is reestablished, thereby reducing the risk of losing the data referenced in the offline modifications to the client object 214 and the risk of duplicating the execution of previously executed operations.

Figure 4:
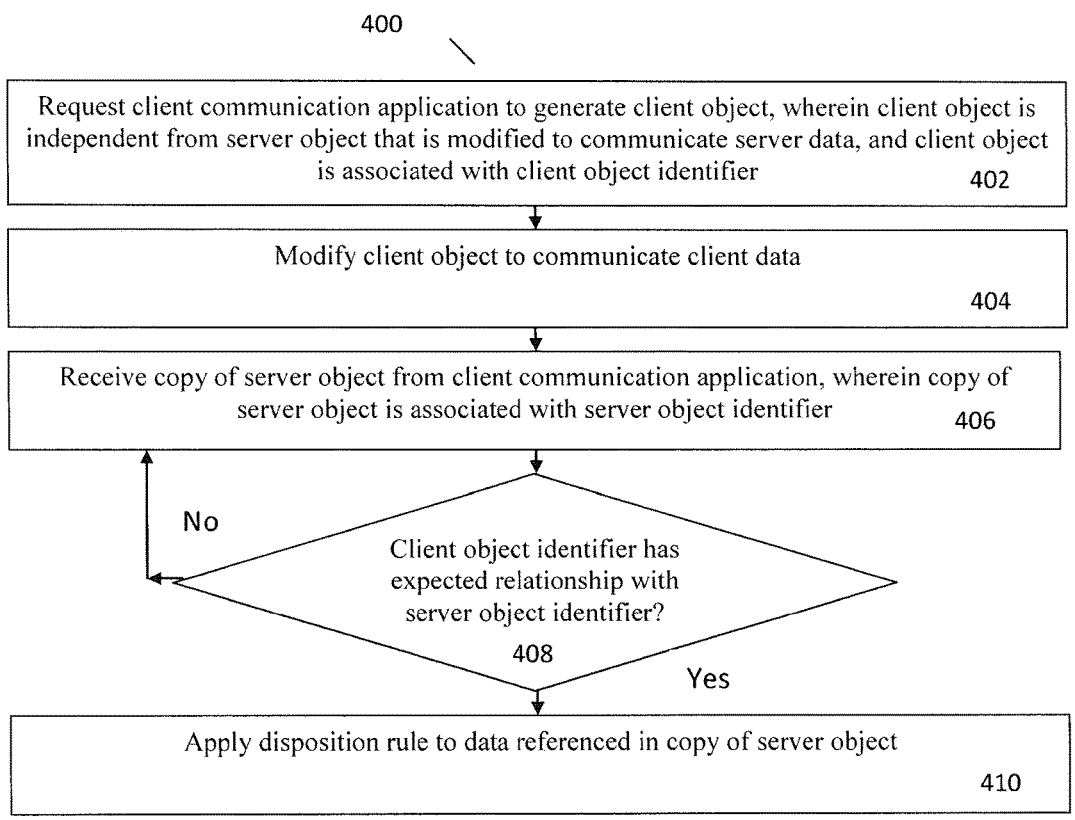
FIG. 4 is a flowchart that illustrates another method of enhanced client-server communication in a cached communication environment, under an embodiment.

FIG. 4 is a flowchart that illustrates another method of enhanced client-server communication in a cached communication environment. Flowchart 400 illustrates method acts illustrated as flowchart blocks for certain steps involved in and between the client 202 and the server 204 of FIG. 2.

The client communication application 206 is requested to generate the client object 214, wherein the client object 214 is independent from the server object 220 that is modified to communicate server data, and the client object 214 is associated with a client object identifier 216, act 402. For example, the client application 210 requests the client communication application 206 to generate the client object 214 and the client object identifier 216, which has the version number of 10. When the communication applications 206-

208 synchronize the client 202 and the server 204, the server communication application 208 generates the copy of the client object 218 in response to the client communication application 206 generating the client object 214.

The client object 214 is modified to communicate client data, act 404. For example, the client application 210 modifies the client object 214 to communicate the client data that requests to delete the emails ABC and XYZ from the archives stored in the server 204 and increments the client object identifier 216 from the version number of 10 to the version number of 11.

A copy of the server object 224 is received from the client communication application 206, wherein the copy of the server object 224 is associated with the server object identifier 222, act 406. For example, the client application 210 receives the copy of the server object 224 that provides the confirmation of the deletion of the email XYZ, and is associated with the server object identifier 222, which has the version number of 11.

A determination is made whether the client object identifier 216 has an expected relationship with the server object identifier 222, act 408. For example, the client application 210 determines that the client object identifier 216 has a version number of 11, which is equal to the version number of 11 for the server object identifier 222. If the client object identifier 216 has the expected relationship with the server object identifier 222, the method 400 continues to act 410. If the client object identifier 216 does not have the expected relationship with the server object identifier 220, the method 400 returns to act 406 until the client object identifier 216 has the expected relationship with the server object identifier 222.

A disposition rule is applied to data referenced in the copy of the server object 224, act 410. For example, the client application 210 removes the request to delete the email XYZ from the client object 214. Following act 410, the flowchart 400 may terminate.

Although FIG. 4 depicts the acts 402-410 occurring in a specific order, the acts 402-410 may occur in another order. The client object 214 that is independent from the server object 220 and is associated with the client object identifier 216 ensures that an offline modification to the client object 214 is retained when client-server communication is reestablished, thereby reducing the risk of losing the data referenced in the offline modification to the client object 214 and the risk of duplicating the execution of previously executed operations.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for enhanced client-server communication in a cached communication environment, the system comprising:
   one or more processors; and
   a non-transitory computer-readable medium storing a plurality of instructions, which when executed cause the one or more processors to:
   request a server communication application to generate a server object as a read and write object, which communicates server data from a server computer to a client computer in response the server object being modified, generate a server object identifier associated with the server object on the server computer, and generate a copy on the server computer of a client object in response to a client communication application generating the client object on the client computer, the server object being independent from the client object stored on the client computer, the client object being a read and write object, which communicates client data from the client computer to the server computer in response the client object being modified;
   receive a copy of the modified client object stored on the client computer from the server communication application, the copy of the modified client object being a read only object wherein the copy of the modified client object is associated with a client object identifier;
   use the received copy of the modified client object to synchronize the copy of the client object on the server computer, independently from modifying the server object;
   determine whether the server object identifier has an expected relationship to the client object identifier;
   apply a disposition rule, independent of data referenced in the server object, to data referenced in the copy of the modified client object received before the determination whether the server object identifier has the expected relationship to the client object identifier, the application of the disposition rule being in response to a determination that the server object identifier has the expected relationship to the client object identifier; and
   postpone application of the disposition rule to data referenced in the copy of the client object until the server object identifier has the expected relationship to the client object identifier.

2. The system of claim 1, wherein the server object identifier is at least one of metadata associated with the server object and an attribute associated with the server object.

3. The system of claim 1, wherein the plurality of instructions, when executed will further cause the one or more processors to modify the server object to generate a copy of the server object.

4. The system of claim 1, wherein the plurality of instructions, when executed will further cause the one or more processors to modify the server object identifier by one of increasing a value of the server object identifier and decreasing the value of the server object identifier.

5. The system of claim 1, wherein the plurality of instructions lacks permission to modify the copy of the client object.

6. The system of claim 1, further comprising a processor-based client application, which when executed will cause the one or more processors to:
request the client communication application to generate the client object;
receive a copy of the server object from the client communication application in response the server object being modified;
determine whether the client object identifier has another expected relationship to the server object identifier and
apply another disposition rule to data referenced in the copy of the server object in response to a determination that the client object identifier has the other expected relationship to the server object identifier.

7. The system of claim 6, wherein the client object identifier is at least one of metadata associated with the client object and an attribute associated with the client object.

8. The system of claim 6, wherein the processor-based client application, when executed will further cause the one or more processors to modify the client object to generate the copy of the modified client object.

9. The system of claim 6, wherein the processor-based client application, when executed will further cause the one or more processors to modify the client object identifier by one of increasing a value of the client object identifier and decreasing the value of the client object identifier.

10. The system of claim 6, wherein the processor-based client application lacks permission to modify the copy of the server object.

11. A computer-implemented method for enhanced client-server communication in a cached communication environment, the method comprising:
requesting a server communication application to generate a server object as a read and write object, which communicates server data from a server computer to a client computer in response the server object being modified, generate a server object identifier associated with the server object on the server computer, and generate a copy on the server computer of a client object in response to a client communication application generating the client object on the client computer, the server object being independent from the client object stored on the client computer, the client object being a read and write object, which communicates client data from the client computer to the server computer in response the client object being modified;
receiving a copy of the modified client object stored on the client computer from the server communication application, the copy of the modified client object being a read only object wherein the copy of the modified client object is associated with a client object identifier;
using the received copy of the modified client object to synchronize the copy of the client object on the server computer, independently from modifying the server object;
determining whether the server object identifier has an expected relationship to the client object identifier;
applying a disposition rule, independent of data referenced in the server object, to data referenced in the copy of the modified client object received before the determination whether the server object identifier has the expected relationship to the client object identifier, the application of the disposition rule being in response to a determination that the server object identifier has the expected relationship to the client object identifier; and
postponing application of the disposition rule to data referenced in the copy of the client object until the server object identifier has the expected relationship to the client object identifier.

12. The method of claim 11 further comprising modifying the server object to communicate server data.

13. The method of claim 11 further comprising:
requesting the client communication application to generate the client object;
receiving a copy of the server object from the client communication application in response the server object being modified;
determining whether the client object identifier has another expected relationship with the server object identifier; and
applying another disposition rule to data referenced in the copy of the server object in response to a determination that the client object identifier has the another expected relationship with the server object identifier.

14. The method of claim 13 further comprising modifying the client object to communicate client data.

15. A computer program product, comprising a non-transitory computer-readable medium having a computer readable program code embodied therein to be executed by one or more processors, the program code including instructions to:
request a server communication application to generate a server object as a read and write object, which communicates server data from a server computer to a client computer in response the server object being modified, generate a server object identifier associated with the server object on the server computer, and generate a copy on the server computer of a client object in response to a client communication application generating the client object on the client computer, the server object being independent from the client object stored on the client computer, the client object being a read and write object, which communicates client data from the client computer to the server computer in response the client object being modified;
receive a copy of the modified client object stored on the client computer from the server communication application, the copy of the modified client object being a read only object wherein the copy of the modified client object is associated with a client object identifier;
use the received copy of the modified client object to synchronize the copy of the client object on the server computer, independently from modifying the server object;

determine whether the server object identifier has an expected relationship to the client object identifier;

apply a disposition rule, independent of data referenced in the server object, to data referenced in the copy of the modified client object received before the determination whether the server object identifier has the expected relationship to the client object identifier, the application of the disposition rule being in response to a determination that the server object identifier has the expected relationship to the client object identifier; and postpone application of the disposition rule to data referenced in the copy of the client object until the server object identifier has the expected relationship to the client object identifier.

16. The computer program product of claim 15, the program code including further instructions to modify the server object to communicate server data.

17. The computer program product of claim 15, the program code including further instructions to:

request the client communication application to generate the client object;

receive a copy of the server object from the client communication application in response the server object being modified;

determine whether the client object identifier has another expected relationship with the server object identifier; and apply another disposition rule to data referenced in the copy of the server object in response to a determination that the client object identifier has the other expected relationship with the server object identifier.

18. The computer program product of claim 17, the program code including further instructions to modify the client object to communicate client data.

* * * * *